June 10, 1952  O. SCHWARM ET AL  2,600,131
LAWN HAND SEEDER
Filed Oct. 8, 1946
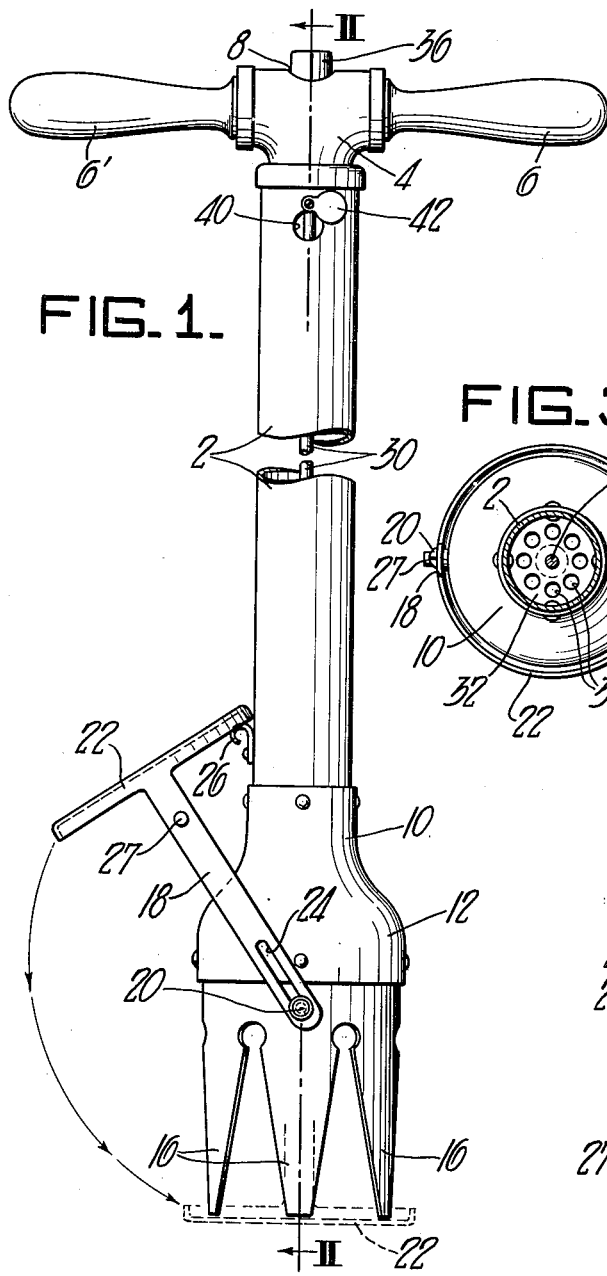
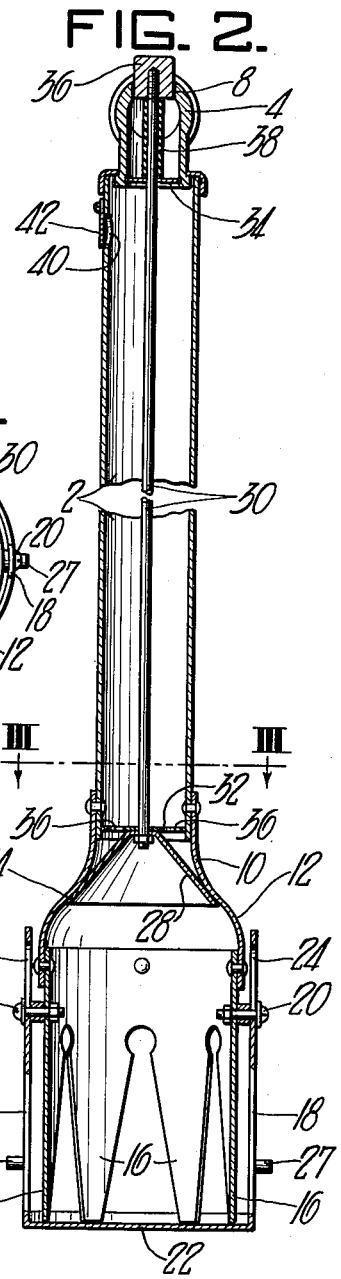
Inventors:
OTTO SCHWARM and
JOSEPH A. PRASKY,
by: Adrian J. Tate
their Attorney.

Patented June 10, 1952

2,600,131

UNITED STATES PATENT OFFICE 2,600,131

LAWN HAND SEEDER

Otto Schwarm and Joseph A. Prasky, Dormont, Pa.

Application October 8, 1946, Serial No. 701,918

1 Claim. (Cl. 111—1)

This invention relates to improvements in combined cultivating and seeding tools and more particularly to a combined cultivating and seeding tool for patching lawns and the like.

In tending grass lawns, it is frequently desirable to plant a small bare space resulting from the grass at that particular spot having died or due to the removal of unsightly growths, such as dandelions or weeds. There are a number of tools available for planting a whole lawn, but none for planting a small part thereof.

It is accordingly an object of the present invention to provide a suitable tool for patching lawns.

It is a further object to provide a lawn patching hand tool which is simple in design and easy to use.

It is a further object to provide a combined cultivating, seeding and tamping tool for patching lawns.

The foregoing and further objects will become apparent from the following specification when read in conjunction with the attached drawing, wherein:

Figure 1 is an elevation of my improved tool arranged for cultivating and seeding;

Figure 2 is a vertical sectional view of my improved tool arranged for tamping, the view being largely taken on line II—II of Figure 1; and Figure 3 is a section on lines III—III of Figure 2.

Referring more particularly to the drawing, the numeral 2 designates a tubular body member on the upper end of which is suitably secured a T-cap 4 to which handles 6, 6' are secured in any suitable manner and which has an opening 8 in the upper side thereof for a purpose which will be latter described.

At the lower end of the body member, there is provided an outwardly flared portion or member 10 having a generally conical or bell shape with an enlarged bottom portion 12. The inner side of the flared portion provides a valve seat as at 14. Below the enlarged portion 12, there is provided an integral or separate member having a series of annularly disposed integral teeth members 16. Thus, it is seen that pushing the teeth 16 into the soil by exerting pressure downwardly on the handles 6, 6' and then partially rotating the tool by turning the handles, the soil will be well broken up and a few such operations will thoroughly cultivate a small patch of soil.

Pivotally mounted above the teeth 16 by arms 18 on pins 20, is a cover member 22. The arms are slotted as at 24 to permit the cover to be swung upwardly around the teeth and engage a spring catch 26 on the lower end of the body member 2 to hold the cover member inoperative. Lugs 27 may be provided on the arms 18 to facilitate raising and lowering of the cover.

Interiorly disposed in the flared portion 10 and adapted to seat on the valve seat 14, is a conical valve member 28 secured to the lower end of a valve stem or rod 30 and carried thereby. The valve rod is reciprocably mounted concentrically of the body member 2 and held concentrically therein by disc guides 32 and 34. Disc 32 is secured to the inner side of the body member 2 adjacent the lower end thereof and has a plurality of apertures 36 therein around the valve rod. The upper disc 34 may be conveniently secured within the T-shaped cap 4 so that it may be assembled as a unit. Disposed around the valve stem 30, above the disc 34 and compressed between the disc 34 and a cap 36 is a spring member 38, which may be a length of resilient tubing such as a rubber hose. The length of the valve rod is such that cap member 36 will be disposed in the aperture 8 and extend slightly above the T-cap 4. Due to its being compressed between the disc 32 and the disc 34, the spring 38 forces the valve rod upwardly and causes the valve 28 to engage the seat 14. Downward pressure on the cap 36 will, however, lower the valve 28 against the spring pressure, which will return the valve to engagement with the valve seat when the pressure is removed from the cap.

The hole 40 is provided in the upper portion of the body member and may be provided with a cover 42.

From the foregoing, it is seen that the interior of the body member 2 provides a magazine or chamber for suitable material such as lawn grass seeds. Such material can be introduced through the hole 40 and is retained therein by the valve 28 being held in engagement with the valve seat portion of the bell portion 12 by the spring 38. Thus, it is seen that after the soil has been properly cultivated in the manner hereinbefore described, pressure on the cap 36 will open the valve 28 to permit some of the seeds contained in the magazine to drop down onto the soil. The amount of seeds so deposited can easily be regulated by the amount of pressure applied to the cap 36 and the time it is depressed. After the cultivated space has been seeded in this manner, the cover member 22 is moved into position on the teeth 16 and such soil can then be tamped down by using the tool as a tamper. Thus, it is seen that we have combined into a compact tool, a tool suitable for patching lawns combining a cultivator, a seeder and a tamper.

While we have shown and described one specific embodiment of our invention, it will be understood that this embodiment is merely for the purpose of illustration and description and that various other forms may be devised within the scope of our invention, as defined in the appended claim.

We claim:

A combined cultivating and seeding hand tool comprising a slender vertically disposed tubular body member forming a seed magazine portion and having an opening therein adjacent its upper end for placing seeds therein, a closure for said opening, a T-shaped handle member disposed on and closing the upper end of said body member, a valve in said body member closing the lower end of said magazine portion, an operating rod connected to said valve and extending upwardly through said body member and above said T-shaped handle, means resiliently biasing said rod upwardly and said valve to closed position, the lower end of said body member being formed with an enlarged portion and an annular toothed cultivating member secured to and depending from said enlarged portion, whereby said valve may be selectively opened to release seeds interiorly of said cultivating member during use of the tool to cultivate and seed the soil.

OTTO SCHWARM.
JOSEPH A. PRASKY.

REFERENCES CITED

The following references are of record in the file of this patent:

UNITED STATES PATENTS

| Number | Name | Date |
|---|---|---|
| 423,645 | Walter | Mar. 18, 1890 |
| 588,386 | Blaisdell | Aug. 17, 1897 |
| 1,182,913 | Kollenberg | May 16, 1916 |
| 1,295,665 | Younger | Feb. 25, 1919 |
| 1,314,546 | Stratton | Sept. 2, 1919 |
| 1,339,256 | Browning | May 4, 1920 |
| 1,883,771 | Duncan | Oct. 18, 1932 |
| 2,291,160 | Johnson | July 28, 1942 |

FOREIGN PATENTS

| Number | Country | Date |
|---|---|---|
| 22,834 | Great Britain | 1912 |
| 47,050 | Germany | May 23, 1889 |
| 55,367 | Austria | Sept. 10, 1912 |
| 510,371 | Great Britain | Aug. 1, 1939 |